United States Patent
Sabato et al.

(10) Patent No.: US 9,705,812 B2
(45) Date of Patent: *Jul. 11, 2017

(54) PORT-BASED FAIRNESS PROTOCOL FOR A NETWORK ELEMENT

(71) Applicant: Cisco Technology, Inc., San Jose, CA (US)

(72) Inventors: Simon Luigi Sabato, Saratoga, CA (US); Hiroshi Suzuki, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/857,100

(22) Filed: Sep. 17, 2015

(65) Prior Publication Data

US 2016/0006664 A1   Jan. 7, 2016

Related U.S. Application Data

(63) Continuation of application No. 13/748,963, filed on Jan. 24, 2013, now Pat. No. 9,154,438.

(51) Int. Cl.
*H04L 12/873* (2013.01)
*H04L 12/863* (2013.01)
(Continued)

(52) U.S. Cl.
CPC .......... *H04L 47/52* (2013.01); *H04L 43/0882* (2013.01); *H04L 47/12* (2013.01);
(Continued)

(58) Field of Classification Search
CPC .......... H04L 47/10; H04L 47/12; H04L 47/24; H04L 47/30; H04L 47/621; H04L 47/622;
(Continued)

(56) References Cited

U.S. PATENT DOCUMENTS

| | | | |
|---|---|---|---|
| 2004/0090974 | A1 | 5/2004 | Balakrishnan et al. |
| 2006/0092840 | A1* | 5/2006 | Kwan ............. H04L 47/10 370/230.1 |

(Continued)

OTHER PUBLICATIONS

Lu et al., "Elephant Trap: A low cost device for identifying large flows," 15th IEEE Symposium on High-Performance Interconnects, 2007, 7 pp.

*Primary Examiner* — Yemane Mesfin
*Assistant Examiner* — Peter Chen
(74) *Attorney, Agent, or Firm* — Meunier Carlin & Curfman LLC (57) ABSTRACT

Methods, apparatuses, and computer-readable medium for providing a fairness protocol in a network element are disclosed herein. An example method includes receiving one or more packets at each of a plurality of ingress ports of the network element, and scheduling the packets into a plurality of queues, wherein each of the queues is associated with packets that are sourced from one of the ingress ports. The method also includes monitoring a bandwidth of traffic sourced from each of the ingress ports, identifying a port among the ingress ports that sources a smallest bandwidth of traffic, and arbitrating among the queues when transmitting packets from an egress port of the network element by giving precedence to the identified port that sources the smallest bandwidth of traffic. Additionally, arbitrating among the queues distributes a bandwidth of the egress port equally among the ingress ports.

20 Claims, 7 Drawing Sheets

(51) Int. Cl.
*H04L 12/867* (2013.01)
*H04L 12/801* (2013.01)
*H04L 12/26* (2006.01)

(52) U.S. Cl.
CPC .......... *H04L 47/621* (2013.01); *H04L 47/629* (2013.01); *H04L 47/6265* (2013.01)

(58) Field of Classification Search
CPC .............. H04L 47/623; H04L 47/6215; H04L 47/6265; H04L 47/629; H04L 47/52; H04L 49/254; H04L 49/90; H04L 12/5693; H04L 2012/5679; H04L 2012/5681
See application file for complete search history.

(56) References Cited

U.S. PATENT DOCUMENTS

| | | |
|---|---|---|
| 2006/0092845 A1 | 5/2006 | Kwan et al. |
| 2007/0206602 A1 | 9/2007 | Halabi et al. |
| 2008/0225740 A1* | 9/2008 | Martin ................ H04L 12/2602 370/252 |
| 2009/0161684 A1 | 6/2009 | Voruganti et al. |
| 2012/0275301 A1 | 11/2012 | Xiong |
| 2014/0105218 A1 | 4/2014 | Anand et al. |

* cited by examiner

PORT-BASED FAIRNESS PROTOCOL FOR A NETWORK ELEMENT

CROSS-REFERENCE TO RELATED APPLICATIONS

This application is a continuation of U.S. patent application Ser. No. 13/748,963, filed on Jan. 24, 2013, now issued as U.S. Pat. No. 9,154,438, entitled "PORT-BASED FAIRNESS PROTOCOL FOR A NETWORK ELEMENT," the disclosure of which is expressly incorporated herein by reference in its entirety.

BACKGROUND

Daisy chains are notoriously unfair structures in networking. For example, when network elements such as switches are communicatively connected in a daisy chain configuration, the first network element in the daisy chain configuration gets the least amount of bandwidth unless measures are taken. This is commonly referred to as the parking lot problem.

The parking lot problem can be addressed by per-flow queuing where incoming packets are separated into flows. The packets of each flow share a set of common characteristics such as a source IP address, a destination IP address, a source port, a destination port, a protocol, a service to be performed on the packet or any other packet characteristic. Scheduling decisions are made for each flow. However, because of the large number of possible flows, particularly in cases where the network elements are connected in a daisy chain configuration, per-flow queuing can become exceptionally expensive.

Alternatively, the parking lot problem can be addressed by per-flow accounting combined with per-flow dropping. However, per-flow accounting and dropping requires packets to be queued at each node. The latency experienced by each packet is therefore increased because it is related to how many network elements the packet needs to traverse in the daisy chain. Additionally, per-flow accounting and dropping requires maintenance of per-flow drop counters at each of the network elements to avoid loss of information. Accordingly, per-flow queuing and per-flow accounting and dropping may not be feasible to solve the parking lot problem in every networking scenario.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a", "an", "the", include plural referents unless the context clearly dictates otherwise. The term "comprising" and variations thereof as used herein is used synonymously with the term "including" and variations thereof and are open, non-limiting terms. While implementations will be described for providing a fairness protocol in network elements communicatively connected in a daisy chain configuration, it will become evident to those skilled in the art that the implementations are not limited thereto, but are applicable for providing the fairness protocol in network elements communicatively connected in other configurations. For example, as discussed in detail below, it is possible to implement the fairness protocol in network elements communicatively connected in any network topology including, but not limited to, a tree structure topology.

Methods and apparatuses for providing a fairness protocol in a network element are disclosed herein. In accordance with the disclosed fairness protocol, the average bandwidth of traffic sourced from each of a plurality of ingress ports is monitored. The largest bandwidth of traffic sourced from a port within a first group of ingress ports (e.g., ingress ports of a network element) is identified and compared to the largest bandwidth of traffic sourced from a port within a second group of ingress ports (e.g., ingress ports of one or more network elements communicatively connected to the network element). In order to fairly allocate bandwidth when transmitting traffic that is sourced from the first and second groups, precedence is given to traffic flowing from the group associated with the identified port sourcing the lower bandwidth of traffic. As a result, the system settles on a fair allocation of bandwidth to the first and second groups regardless of how many ports are present in each group.

Figure 1:
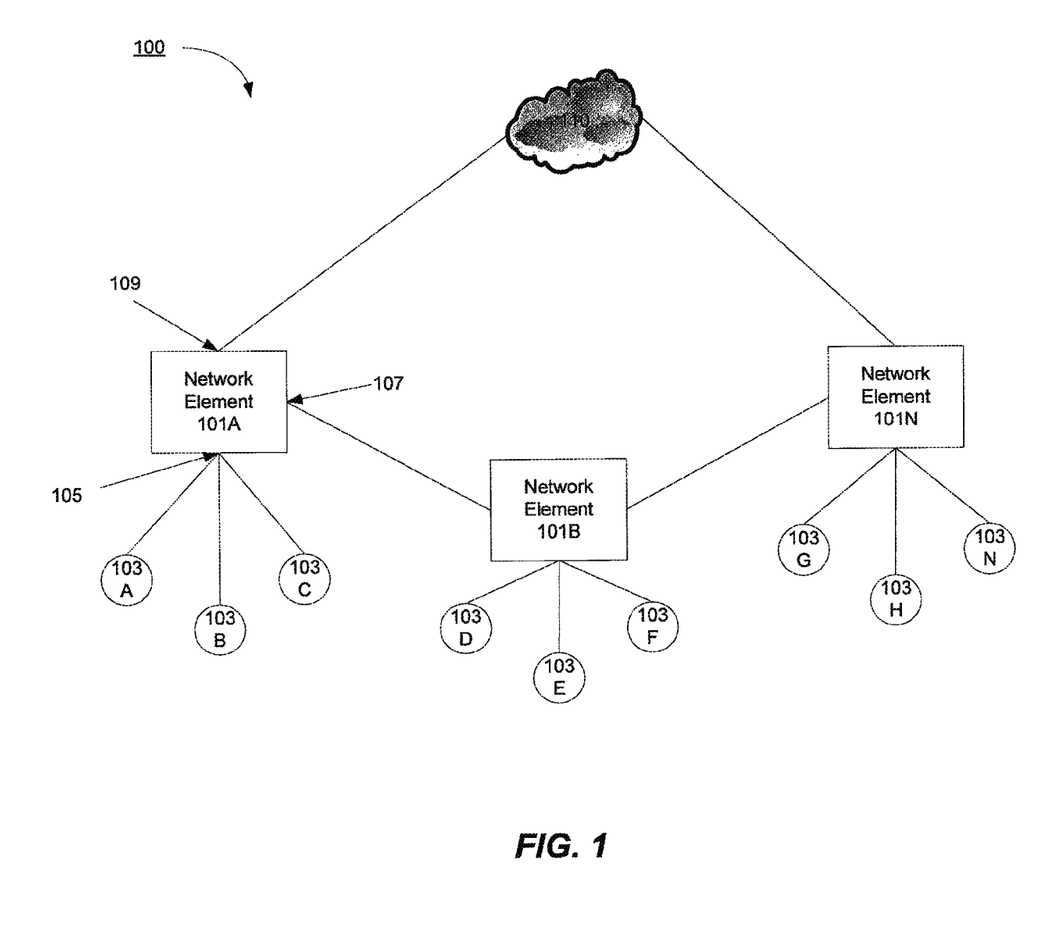
FIG. 1 is a block diagram of a network including network elements communicatively connected in a daisy chain configuration.

Referring now to FIG. 1, a block diagram of a network 100 including network elements 101A, 101B, 101N communicatively connected in a daisy chain configuration is shown. For example, network elements 101A, 101B, 101N can be packet-forwarding elements and can include hardware or software or a combination of hardware and software that provides switching or routing functionality. A packet-forwarding element can be configured to receive packets, make packet-forwarding decisions and transmit the packets based on the packet-forwarding decisions. As shown in FIG. 1, network elements 101A, 101B, 101N can be communicatively connected in a daisy chain configuration. The ends of the daisy chain (e.g., network elements 101A and 101N) can be communicatively connected to a communication network 110, for example. This disclosure contemplates that the communication network 110 is any suitable communication network. For example, the communication network 110 can be a local area network (LAN), a wireless local area network (WLAN), a wide area network (WAN), a metropolitan area network (MAN), a virtual private network (VPN), etc., including portions or combinations of any of the above networks.

Additionally, network nodes 103A, 103B, 103C, 103D, 103E, 103F, 103G, 103H, 103N ("103A . . . 103N") can be communicatively connected to one or more of network elements 101A, 101B, 101N. The network nodes 103A . . . 103N can be any type of network-connectable device including, but not limited to, personal computers, laptop computers, tablet computers, mobile computing devices, printers, etc. This disclosure contemplates that network elements 101A, 101B, 101N, network nodes 103A . . . 103N and the communication network 110 can be communicatively connected though any suitable communication link. For example, a communication link may be implemented by any medium that facilitates data exchange among network elements 101A, 101B, 101N, network nodes 103A . . . 103N and the communication network 110 shown in FIG. 1 including, but not limited to, wired, wireless and optical links. Example communication links include, but are not limited to, a LAN, a WAN, a MAN, Ethernet, the Internet, or any other wired or wireless link such as WiFi, WiMax, 3G or 4G.

As shown in FIG. 1, when network elements 101A, 101B, 101N are communicatively connected in the daisy chain configuration, each network element 101A, 101B, 101N is communicatively connected between two network elements (e.g., network element 101B) or a network element and a communication network (e.g., network elements 101A and 101N). For example, network element 101A is communicatively connected to network element 101B through a transit ingress port 107 and communicatively connected to the communication network 110 through a transit egress port 109. Additionally, network element 101A is communicatively connected to network nodes 103A, 103B, 103C through one or more local ingress ports 105. Accordingly, traffic (e.g., data packets) traversing the daisy chain from upstream (e.g., from network elements 101B, 101N) ingresses network element 101A through the transit ingress port 107, while traffic traversing the daisy chain downstream (e.g., to the communication network 110) egresses network element 101A through the transit egress port 109. It should be understood that network elements 101A, 101B, 101N can be configured such that a portion of the traffic traverses the daisy chain in the clockwise direction and a portion of the traffic traverses the daisy chain in the counter-clockwise direction to more efficiently use network resources. For example, each network element 101A, 101B, 101N can optionally be configured to include additional transit ingress and transit egress ports, and the local ingress ports 105 can be configured to direct traffic in the clockwise or counter-clockwise direction. It should be understood that the network configuration shown in FIG. 1 is only an example network configuration and that this disclosure contemplates that other network configurations are possible, including more or fewer network elements, network nodes, communication links, etc.

Figure 2A:
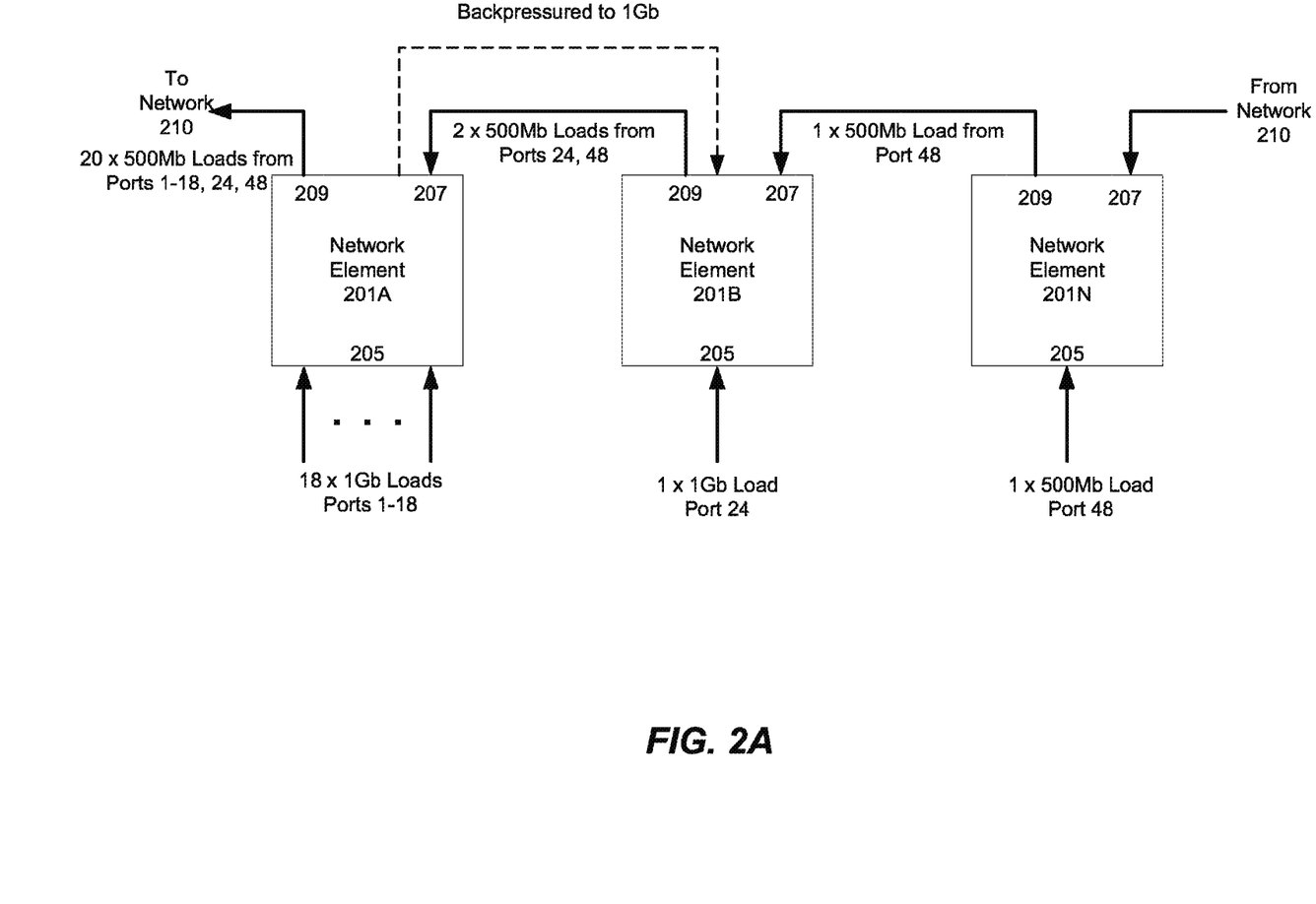
FIGS. 2A-2B are block diagrams illustrating operations for implementing a fairness protocol in network elements communicatively connected in a daisy chain configuration.
Figure 2B:
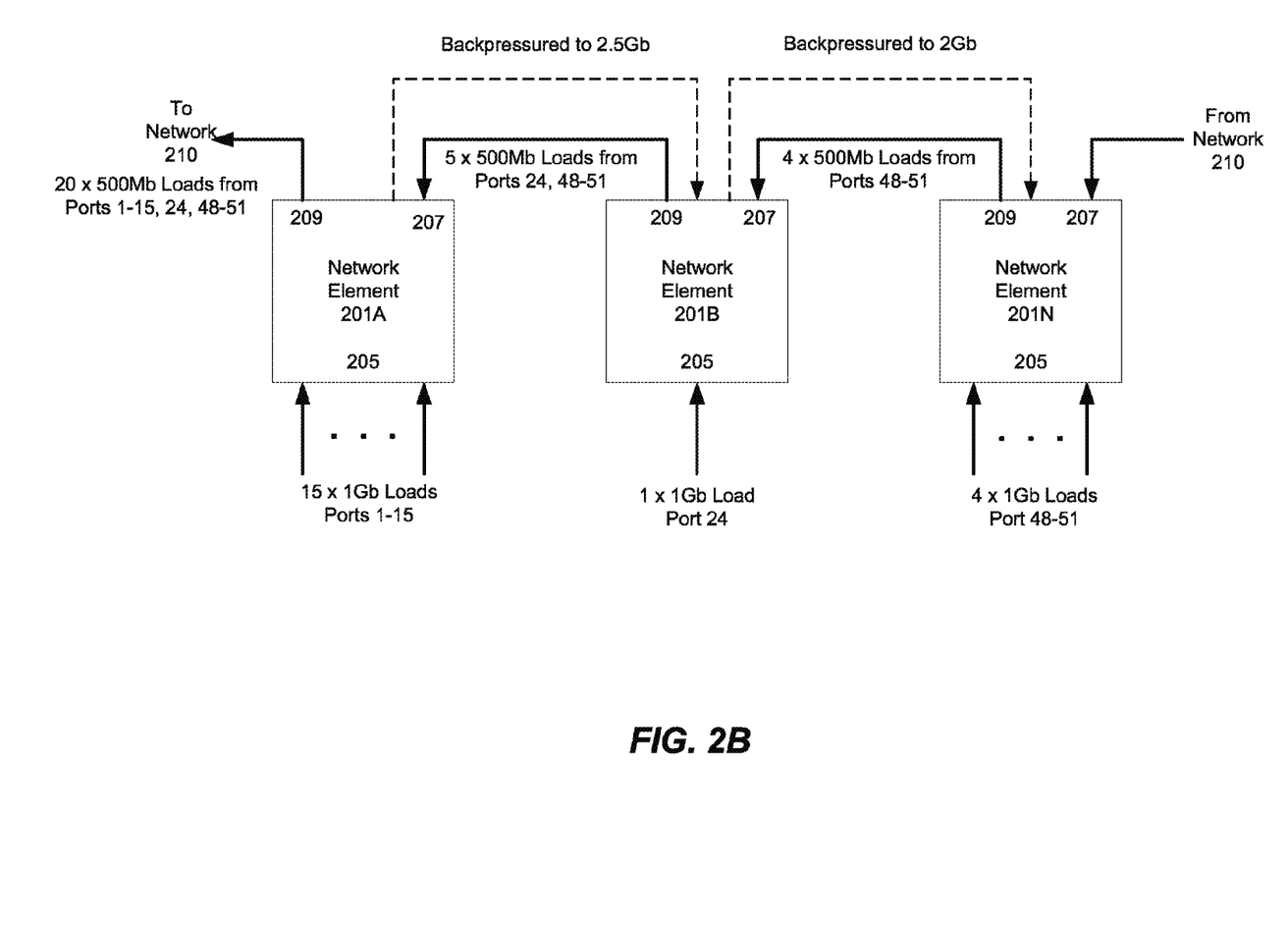

Referring now to FIGS. 2A-2B, block diagrams illustrating operations for implementing a fairness protocol in network elements 201A, 201B, 201N communicatively connected in a daisy chain configuration are shown. In some implementations, network elements 201A, 201B, 201N can be implemented in a similar configuration as discussed above with regard to FIG. 1. For example, as shown in FIGS. 2A-2B, network elements 201A, 201B, 201N are communicatively connected in a daisy chain configuration between a communication network 210. Additionally, each of network elements 201A, 201B, 201N includes one or more local ingress ports 205, a transit ingress port 207 and a transit egress port 209. The transit ingress port 207 and the transit egress port 209 can be the daisy chain ports (e.g., the ports through which traffic traversing the daisy chain ingresses/egresses).

As shown in FIGS. 2A-2B, one or more local packets are received at the one or more local ingress ports 205 of each of network elements 201A, 201B, 201N. The local packets can be received from network nodes directly connected to each of the network elements 201A, 201B, 201N through one or more of the local ingress ports 205. The local ingress ports 205 can optionally implement first-in, first-out ("FIFO") queues, for example. Upon receipt at the local ingress ports 205, the local packets can be scheduled into a local transit queue, for example. It should be understood that there are a number of known methods for scheduling received packets into a local transit queue. In some implementations, the amount of bandwidth available for transmitting from the transit egress ports 209 is sufficient to accommodate all of the local packets received at the local ingress ports 205. In other implementations, backpressure scheduling can be applied to restrict the amount of bandwidth available to network elements 201A, 201B, 201N for transmitting from the transit egress ports 209, respectively. By implementing backpressure scheduling, a network element can be forced to allocate a portion of the available bandwidth to each of a plurality of loads (e.g., provide load balancing among the loads). Additionally, one or more remote packets are received at the remote transit ingress ports 207 of each of network elements 201A, 201B, 201N. The remote packets can be received from one or more network elements communicatively connected upstream, for example. In particular, the remote packets can be sourced from one or more of the local ingress ports of one or more network elements communicatively connected upstream from the network element that receives the remote packets.

According to implementations discussed herein, at least one of the remote packets received at the transit ingress port 207 can be copied to a remote transit queue for transmission from the transit egress port 209 of each network element 201A, 201B, 201N, respectively. Similarly to the local ingress ports 205, the transit ingress ports 207 can be configured to optionally implement FIFO queues (e.g., remote transit queues). The transit ingress port 207 and the transit egress port 209 of each network element 201A, 201B, 201N can be opposite daisy chain ports, for example. Thus, the remote packets copied to the remote transit queue can be addressed to destination network nodes directly connected to network elements communicatively connected downstream in the daisy chain. Additionally, one or more of the remote packets can be copied to one or more local egress ports. The remote packets copied to the local egress ports can be addressed to destination network nodes directly connected to the network element that receives the remote packets, for example. Optionally, according to implementations discussed herein, packets (e.g., local packets, remote packets, etc.) can only be dropped at local ingress/egress ports, and packets (e.g., local packets, remote packets, etc.) cannot be dropped from the local/remote transit queues. In other words, if a local packet received at one of the local ingress ports 205 is scheduled into the local transit queue, the packet cannot be dropped while it traverses the daisy chain. After the local packet is scheduled into the local transit queue, the packet cannot be dropped until it is copied to a local egress port prior to delivery to a destination network node. Thus, the local ingress ports 205 can serve as the congestion points in the daisy chain. Optionally, the local ingress ports 205 can serve as the only congestion points in the daisy chain.

In FIG. 2A, steady state behavior of example operations for implementing a fairness protocol according to an implementation discussed herein is shown. In FIG. 2A, the communication links communicatively connecting network elements, network nodes and the communication network can be 10 Gbps links, for example. It should be understood, however, that the communication links can support greater or lesser link speeds and that the operating characteristics of the communication links can be chosen by the network administrator, for example. Network element 201N can be configured to receive local packets at the local ingress ports 205 such as Port 48, which supports a 500 Mb load. The local packets can be scheduled into the local transit queue of network element 201N. Because the transit egress port 209 of network element 201N can support transmission of the entire load (e.g., 500 Mb) through the transit egress port 209, network element 201N does not drop any local packets. In addition, backpressure scheduling is unnecessary because there is only a single local load received at network element 201N.

Network element 201B can be configured to receive local packets at the local ingress ports 205 such as Port 24, which supports a 1 Gb load. Network element 201B can be configured to schedule one or more of the local packets into the local transit queue. Additionally, network element 201B can be configured to receive remote packets at the transit ingress port 207 (e.g., 500 Mb sourced from network element 201N) and can be configured to copy one or more of the remote packets into the remote transit queue. As discussed in detail below, network element 201B can be configured to arbitrate between the local transit queue and the remote transit queue when transmitting packets from the remote egress port 209 based on a highest bandwidth flow among the flows sourced from each of the local ingress ports 205 and the remote ingress port 207. Thus, in FIG. 2A, network element 201B transmits two, 500 Mb loads (e.g., 500 Mb sourced from each of Ports 24 and 48) from the remote egress port 209. Network element 201B drops 500 Mb of the load received at the local ingress ports 205 based on being back pressured to 1 Gb by network element 201A, with a maximum packet rate sourced from network element 201N being 500 Mbps.

Network element 201A can be configured to receive local packets at the local ingress ports 205 such as Ports 1-18, which each support a 1 Gb load. Network element 201A can be configured to schedule one or more of the local packets into the local transit queue. Additionally, network element 201A can be configured to receive remote packets at the transit ingress port 207 (e.g., 500 Mb sourced from each of network elements 201B, 201N) and can be configured to copy one or more of the remote packets into the remote transit queue. As discussed in detail below, network element 201A can be configured to arbitrate between the local transit queue and the remote transit queue when transmitting packets from the remote egress port 209 based on a highest bandwidth flow among the flows sourced from each of the local ingress ports 205 and the remote ingress port 207. Thus, in FIG. 2A, network element 201A transmits twenty, 500 Mb loads (e.g., 500 Mb sourced from each of Ports 1-18, 24 and 48) from the remote egress port 209. Network element 201A drops 500 Mb of the load received at each of the local ingress ports 205 (e.g., Ports 1-18).

In FIG. 2B, steady state behavior of example operations for implementing a fairness protocol according to another implementation discussed herein is shown. A number of the features shown in FIG. 2B are identical to the features shown in FIG. 2A, and are therefore not discussed in detail with regard to FIG. 2B. Network element 201N can be configured to receive local packets at the local ingress ports 205 such as Ports 48-51, which each support a 1 Gb load. The local packets can be scheduled into the local transit queue of network element 201N. Network element 201N drops 500 Mb of the load received at each of the local ingress ports 205 based on being back pressured to 2 Gb by network element 201B. In addition, by back pressuring network element 201N, network element 201N can allocate bandwidth equally among the loads received at each of the local ingress ports 205.

Network element 201B can be configured to receive local packets at the local ingress ports 205 such as Port 24, which supports a 1 Gb load. Network element 201B can be configured to schedule one or more of the local packets into the local transit queue. Additionally, network element 201B can be configured to receive remote packets at the transit ingress port 207 (e.g., 2 Gb sourced from network element 201N) and can be configured to copy one or more of the remote packets into the remote transit queue. As discussed in detail below, network element 201B can be configured to arbitrate between the local transit queue and the remote transit queue when transmitting packets from the remote egress port 209 based on a highest bandwidth flow among the flows sourced from each of the local ingress ports 205 and the remote ingress port 207. Thus, in FIG. 2B, network element 201B transmits five, 500 Mb loads (e.g., 500 Mb sourced from each of Ports 24 and 48-51) from the remote egress port 209. Network element 201B drops 500 Mb of the load received at the local ingress ports 205 based on being back pressured to 2.5 Gb by network element 201A, with a maximum packet rate sourced from network element 201N being 500 Mbps.

Network element 201A can be configured to receive local packets at the local ingress ports 205 such as Ports 1-15, which each support a 1 Gb load. Network element 201A can be configured to schedule one or more of the local packets into the local transit queue. Additionally, network element 201A can be configured to receive remote packets at the transit ingress port 207 (e.g., 2.5 Gb sourced from network elements 201B, 201N) and can be configured to copy one or more of the remote packets into the remote transit queue. As discussed in detail below, network element 201A can be configured to arbitrate between the local transit queue and the remote transit queue when transmitting packets from the remote egress port 209 based on a highest bandwidth flow among the flows sourced from each of the local ingress ports 205 and the remote ingress port 207. Thus, in FIG. 2B, network element 201A transmits twenty, 500 Mb loads (e.g., 500 Mb sourced from each of Ports 1-15, 24 and 48-51) from the remote egress port 209. Network element 201A drops 500 Mb of the load received at each of the local ingress ports 205 (e.g., Ports 1-15).

Steady state behaviors of example operations for implementing a fairness protocol are discussed above with regard to FIGS. 2A-2B. Behaviors between an initial state and steady state are discussed below with regard to FIG. 2B. It should be understood that similar behaviors can occur with regard to FIG. 2A. Additionally, it should be understood that the behaviors (and values for loads, bandwidths, etc.) are only provided as examples. Initially, as shown in FIG. 2B, network element 201N receives 4 Gb of load (i.e., 1 Gb×4 flows) from local ingress ports 205. Network element 201N can transfer the entire 4 Gb of load from its remote egress port 209, which has a capacity of 10 Gbps, for example, without backpressure or drops. Network element 201B receives 4 Gb of load (i.e., 1 Gb×4 flows) at its transit ingress port 207 and 1 Gb of load from local ingress ports 205, for a total of 5 Gb of load. Network element 201B can transfer the entire 5 Gb of load from its remote egress port 209, which has a capacity of 10 Gbps, for example, without backpressure or drops. Network element 201A receives 5 Gb of load (i.e., 1 Gb×5 flows) at its transit ingress port 207 and 15 Gb of load (i.e., 1 Gb×15 flows) from its local ingress ports 205. Network element 201A cannot transfer the entire 20 Gb of load from its remote egress port 209, which has a capacity of 10 Gbps, for example, without queuing or drops.

A fairness protocol can be then be implemented. Due to flow accounting, network element 201A can determine the individual bandwidth of each flow, with maximum remote and local flows being 1 Gb, for example. Network element 201A can equally distribute the bandwidth of its remote egress port 209 between the remote and local flows. For example, network element 201A can initially allocate 5 Gb of bandwidth for remote flows and 5 Gb of bandwidth for local flows. It should be understood that this initial allocation results in no backpressure being applied to network element 201B because the entire 5 Gb of load can be transferred from its remote egress port 209. Additionally, the 5 Gb of bandwidth allocated to local flows is divided equally among the local ports 205 of network element 201A, i.e., 5 Gb/15 flows, or approximately 333 Mb per flow. Thus, the maximum remote flow is 1 Gb and the maximum local flow is 333 Mb. Network element 201A can then gradually increase the share of bandwidth for the local flows (i.e., give precedence to the local flows), for example, from 333 Mb to 400 Mb per flow. This results in the total bandwidth allocated for the local flows increasing to 6 Gb, with the remaining 4 Gb being allocated for the remote flows, i.e., 4 Gb/5 flows, or approximately 800 Mb per flow.

Because bandwidth is not equally distributed between remote and local flows, network element 201A can again gradually increase the share of bandwidth for the local flows (i.e., give precedence to the local flows), for example, from 400 Mb to 500 Mb per flow. This results in the total bandwidth allocated for the local flows increasing to 7.5 Gb, with the remaining 2.5 Gb being allocated for the remote flows, i.e., 2.5 Gb/5 flows, or approximately 500 Mb per flow. Thus, each of the remote and local flows become 500 Mb, which is the steady state shown in FIG. 2B. It should be understood that similar behaviors can occur with regard to network element 201B in FIG. 2B. In addition, as discussed herein, the fairness protocol does not require any flow queuing or scheduling. According to the fairness protocol discussed herein, a remote transit queue for one or more remote ports and a local transit queue for one or more local ports are provided and precedence is given to the remote or local queue based on the queue associated with the lower bandwidth of traffic. As a result, it is possible to fairly allocate the bandwidth to the remote and local queues.

Figure 3A:
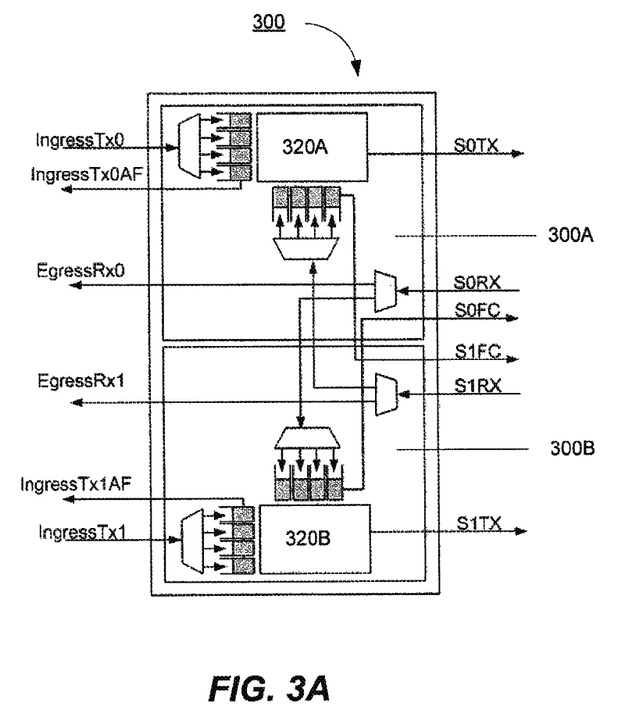
FIG. 3A is a block diagram illustrating an example chain interface module for implementing a fairness protocol in network elements communicatively connected in a daisy chain configuration.

Referring now to FIG. 3A, a block diagram illustrating an example chain interface module 300 for implementing a fairness protocol in network elements communicatively connected in a daisy chain configuration is shown. Each of the network elements (e.g., network elements 101A, 101B, 101N and 201A, 201B, 201N) can include hardware or software or a combination of hardware and software that implements the functionality of a chain interface module such as the chain interface module 300, for example. The chain interface module 300 can include chain interface module 300A that is configured to arbitrate traffic flowing in the clockwise direction around the daisy chain, and chain interface module 300B that is configured to arbitrate traffic flowing in the counter-clockwise direction around the daisy chain. The chain interface module 300A/300B can include an arbitrator module 320A/320B that is configured to arbitrate between the local transit queue and the remote transit queue for each priority level as discussed below. As discussed above, a portion of the local ingress ports can be configured to schedule packets into a local transit queue for the clockwise direction, and a portion of the local ingress ports can be configured to schedule packets into a local transit queue for the counter-clockwise direction. This configuration can be implemented to more efficiently use network resources.

As shown in FIG. 3A, the local packets IngressTx0/IngressTx1 are received at the chain interface module 300A/300B and scheduled into the local transit queue. The packets that are not scheduled into the local transit queue (e.g., IngressTx0AF/IngressTx1AF) are dropped. Optionally, the local packets IngressTx0/IngressTx1 can be scheduled into a plurality of local transit queues for different priority levels (e.g., priority levels 0-3, for example). Accordingly, the operations disclosed herein can be performed in parallel for each of a plurality of priority levels. Although four priorities are shown in FIG. 3A, it should be understood that the number of priority levels can be varied based on system configuration. Additionally, the remote packets S1RX/S0RX are received at the chain interface module 300A/300B and copied into the remote transit queue. For example, the remote packets S1RX flowing in the clockwise direction come into chain interface module 300 and are received by the arbitrator module 320A before transmission from the chain interface module 300 as transmitted packets S0TX. Additionally, the remote packets S0RX flowing in the counter-clockwise direction come into chain interface module 300 and are received by the arbitrator module 320B before transmission from the chain interface module 300 as transmitted packets S1TX. In addition, signals S0FC and S1FC shown in FIG. 3A are the back pressure/flow control signals to rate control the remote packets S0RX and S1RX, respectively. The packets that are not copied into the remote transit queue (e.g., EgressRx1/EgressRx0) are copied to local egress ports for transmission to destination nodes directly connected to the network element, for example. Similarly to the local packets, the remote packets S1RX/S0RX can optionally be copied into a plurality of remote transit queues for different priority levels (e.g., priority levels 0-3, for example).

Figure 3B:
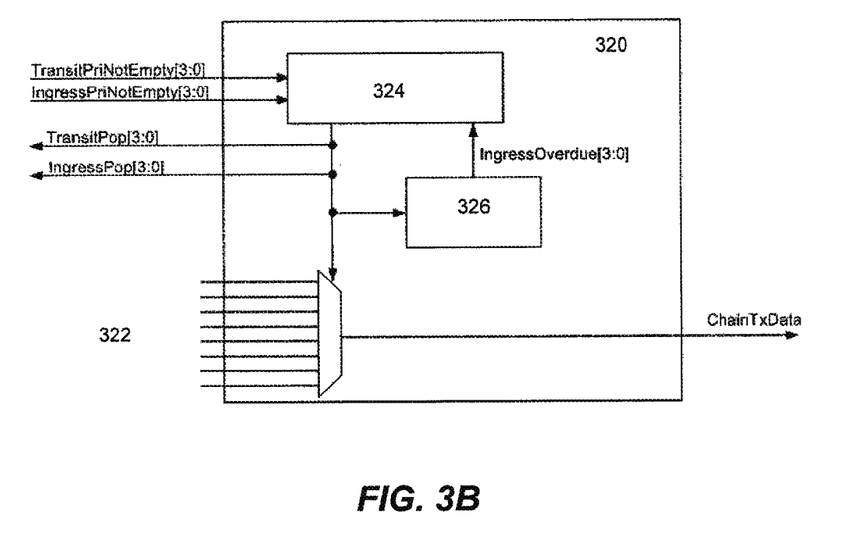
FIG. 3B is a block diagram illustrating an example arbitrator module included in the chain interface module of FIG. 3A.

Referring now to FIG. 3B, a block diagram illustrating an example arbitrator module 320 included in the chain interface module 300 of FIG. 3A is shown. The local transit queue and remote transit queue for each priority level can be received by the arbitrator module 320 at a multiplexer 322, for example. The multiplexer can be configured to select among the local transit queue(s) and the remote transit queue(s) when transmitting packets (e.g., ChainTxData) via a transit egress port of a network element. In FIG. 3B, eight inputs to the multiplexer are shown, which is based on a local transit queue and a remote transit queue for each of four priority levels (e.g., priority levels 0-3). Additionally, the multiplexer 322 can be controlled by a modified round robin module 324. In FIG. 3B, the modified round robin module 324 can be a four-priority modified round robin module, which is configured to operate in parallel for each of four priority levels. As shown in FIG. 3B, the modified round robin module 324 can receive an indication as to whether there are packets in the local transit queue and/or the remote transit queue for each of the priority levels (e.g., IngressPriNotEmpty[3:0], TransitPriNotEmpty[3:0]). The modified round robin module 324 can also generate packet read commands from remote transit queues using TransitPop [3:0] and packet read commands from local ingress queues using IngressPop[3:0]. Additionally, the modified round robin module 324 can receive input from a bandwidth table module 326. The modified round robin module 324 can be configured to arbitrate between local and remote transit queues when transmitting packets based on the input from the bandwidth table module 326. As discussed above, although four priority levels are shown in FIG. 3B, it should be understood that the number of priority levels can be varied based on system configuration.

The bandwidth table module 326 can maintain one or more counters. Each counter can be associated with a port of a network element. For example, each counter can track traffic sourced from a port of a network element. The counter can track traffic sourced from a port of a network element based on the number of packets, the number of bytes, or any other measure (e.g., the number of files/web pages accessed, the number of transactions, etc.). For example, it is possible to monitor the traffic being transmitted from the transit egress port of a network element and determine a port from which each of the transmitted packets was sourced. The port can be identified by address-to-port mapping or explicitly included in the packet header, for example. Additionally, this can be performed for transmitted packets associated with a plurality of priority levels. The priority levels can either be extracted from the packet (e.g., L2 SA/COS, L3 SA/TOS, etc.) or explicitly included in the packet header, for example. In other words, it is possible to determine whether each of the transmitted packets was sourced from a local ingress port (e.g., an ingress port of the network element) or a remote ingress port (e.g., an ingress port of another network element in the daisy chain).

The bandwidth table module 326, therefore, can receive as an input for each packet being transmitted from the transit egress port of the network element a source port, a priority level and a quantity (e.g., TxPacket(system_port, pri, quantity). As discussed above, the quantity can be the number of bytes, the number of packets, or any other measure of quantity. Additionally, the bandwidth table module 326 can update the one or more counters based on the packets being transmitted from the transit egress port of the network element. For example, for each counter maintained by the bandwidth table module 326, the current bandwidth can be incremented each time a packet associated with the counter is being transmitted from the transit egress port of the network element (e.g., $BW_{system\_port,\ pri}$(updated)= $BW_{system\_port,\ pri}$(current)+$TxPackets_{system\_port,\ pri}$(quantity×M), where M is a weight applied per port or per port/priority). In some implementations, M is equal to 1. Alternatively, in other implementations, M can have a value greater than 1. The value of M can vary based on the port or port/priority. For example, if two ports are associated with two different link speeds (e.g., 1000 Mb and 100 Mb, respectively), the value of M can be used to allocate a fair share to each link, where a fair share is not necessarily an equal share. When M=1, each port can be provided with an equal share of bandwidth. However, if the faster link (e.g., 1000 Mb link) should be proportioned a greater share of bandwidth than the slower link (e.g., 100 Mb), the value of M can be set differently for each port (e.g., a larger value of M for a given port or port/priority results in less traffic being accepted). Additionally, for each counter maintained by the bandwidth table module 326, the current bandwidth can be decremented by a fraction of the current bandwidth every fixed period of time (e.g., $$BW_{system\_port,pri}(\text{updated}) = BW_{system\_port,pri}(\text{current}) - \frac{BW{system\_port,\ pri}(\text{current})}{D},$$

where D is a constant applied per port or per port/priority that influences the rate of decay). It should be understood that the fixed time period can be any amount of time (e.g., nanoseconds, seconds, minutes, hours, etc.). Accordingly, by updating (e.g., incrementing and decrementing) the current bandwidth, it is possible to measure the average bandwidth of traffic being sourced from each of the local and remote ingress ports.

The bandwidth table module 326 can be configured to identify the local ingress port and the remote ingress port that source the largest bandwidth of traffic among the one or more local ingress ports and the one or more remote ingress ports, respectively, for each priority level. For example, the bandwidth table module 326 can periodically scan the one or more counters to identify the local ingress port and the remote ingress port that source the largest bandwidth of traffic. The bandwidth table module 326 can be configured to scan the counters after a lapse of a predetermined period of time (e.g., nanoseconds, seconds, minutes, hours, etc.). Thereafter, the bandwidth table module 326 can be configured to compare the largest bandwidth of traffic sourced from the identified local ingress port and the largest bandwidth of traffic sourced from the identified remote ingress port. If the largest bandwidth of traffic sourced from the identified local ingress port is less than the largest bandwidth of traffic sourced from identified remote ingress port, the bandwidth table module 326 can be configured to output a signal (e.g., IngressOverdue[3:0]) that causes the modified round robin module 324 to give precedence to the local transit queue. When the modified round robin module 324 gives precedence to the local transit queue, additional local packets in the local transit queue are transmitted at the expense of remote packets in the remote transit queue, which balances bandwidth of traffic transmitted from the local ingress ports and the remote ingress ports over time regardless of the number of local or remote ingress ports associated with the local or remote transit queue, respectively.

It should be understood that the bandwidth table module 326 discussed above is only provided as an example, and that there are other methods for measuring bandwidth of traffic sourced from the local ingress ports and the remote ingress ports. For example, in some implementations, an elephant trap can be implemented in order to sample and statistically analyze the traffic being transmitted from a transit egress port of a network element. An elephant trap is capable of identifying one or more sources of traffic consuming the largest amounts of bandwidth through sampling and statistical analyses. For example, an elephant trap is discussed in Lu et al., *ElephantTrap: A low cost device for identifying large flows*, 15th IEEE Symposium on High-Performance Interconnects (2007). An elephant trap is well-known in the art and is, therefore, not discussed in detail below. Accordingly, an elephant trap can be implemented in lieu of the bandwidth table module discussed above in some implementations.

The fairness protocol disclosed herein provides a number of advantages. For example, according to the disclosed fairness protocol, the average bandwidth of traffic sourced from each of the one or more local ingress ports and the one or more remote ingress ports is monitored. Then, the port that sources the largest bandwidth of traffic from the one or more local ingress ports (e.g., a local group) and the port that sources the largest bandwidth of traffic from the one or more remote ingress ports (e.g., a remote group) are identified. Precedence is given to the flow (e.g., local group or remote group) with the identified port associated with the smaller bandwidth of traffic. In the end, the system settles on a fair allocation of bandwidth for both the local and remote groups regardless of the number of ports in each group. In other words, the disclosed fairness protocol can optionally only consider the largest bandwidth of traffic sourced from one port in each of the groups instead of considering each flow. Additionally, it is possible to monitor the average bandwidth asynchronously from the scheduling decisions. Thus, the scheduling decisions can occur at a higher speed because there is no requirement for how quickly the average bandwidth needs to be calculated in order to make the scheduling decisions. Further, unlike resilient packet ring ("RPR"), which uses transit FIFO queues, the fairness protocol disclosed herein requires minimal user configuration to obtain fairness.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 4A:
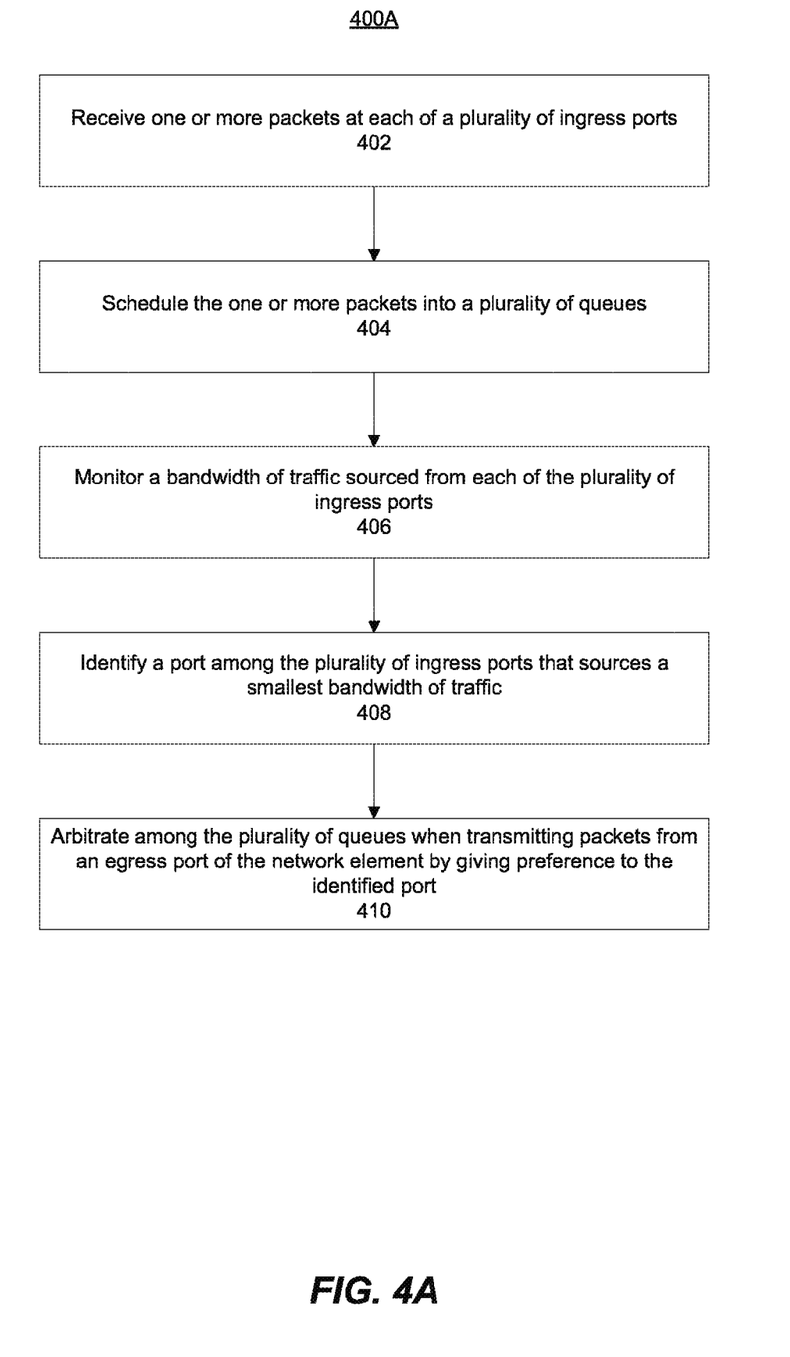
FIGS. 4A-4B are flow diagrams illustrating example operations for implementing a fairness protocol.

In some implementations, it is possible to implement the fairness protocol in network elements communicatively connected in any network topology. For example, FIG. 4A is a flow diagram illustrating example operations 400A for implementing a fairness protocol in a network element. According to the fairness protocol discussed with regard to FIG. 4A, fairness is achieved regardless of network topology by giving preference to a flow among a plurality of flows being sourced from a port that sources a smallest bandwidth of traffic among the plurality of ports. For example, at 402, one or more packets are received at each of a plurality of ingress ports of the network element. At 404, the one or more packets are scheduled into a plurality of queues. Additionally, each of the plurality of queues is associated with packets that are sourced from one of the plurality of ingress ports. At 406, a bandwidth of traffic sourced from each of the plurality of ingress ports is monitored. Then, at 408, a port among the plurality of ingress ports that sources a smallest bandwidth of traffic is identified. At 410, arbitration among the plurality of queues is implemented when transmitting packets from an egress port of the network element by giving preference to the identified port that sources the smallest bandwidth of traffic.

Figure 4B:
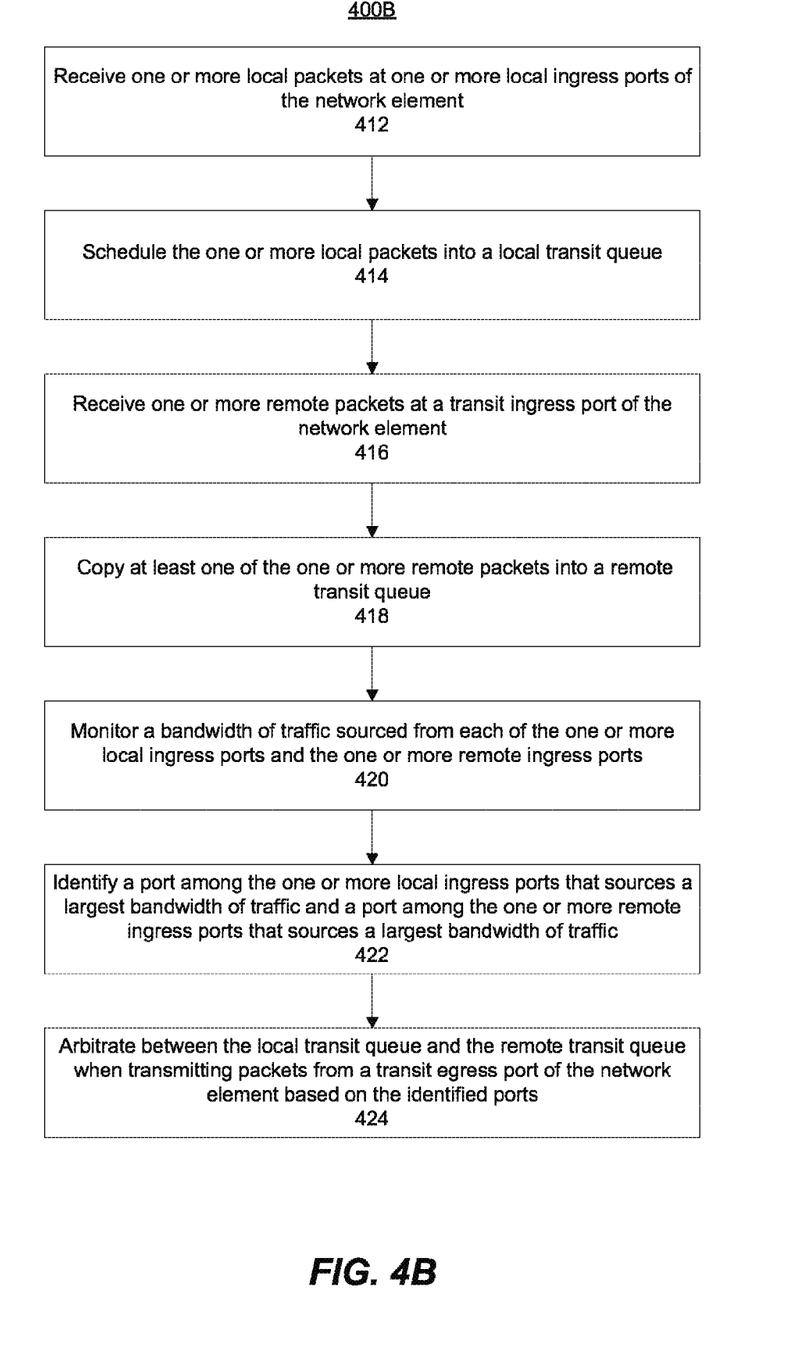

Referring now to FIG. 4B, a flow diagram illustrating example operations 400B for implementing a fairness protocol in a network element is shown. The example operations 400B can be implemented in a network element that is communicatively connected with a plurality of network elements in a daisy chain configuration, for example. At 412, one or more local packets are received at one or more local ingress ports of the network element. At 414, the one or more local packets can be scheduled into a local transit queue. At 416, one or more remote packets are received at a transit ingress port of the network element. For example, the one or more remote packets are sourced from one or more remote ingress ports of one or more of the plurality of network elements communicatively connected with the network element in the daisy chain configuration. At 418, at least one of the one or more remote packets can be copied into a remote transit queue. At 420, a bandwidth of traffic sourced from each of the one or more local ingress ports and the one or more remote ingress ports is monitored. Then, at 422, a port among the one or more local ingress ports that sources a largest bandwidth of traffic and a port among the one or more remote ingress ports that sources a largest bandwidth of traffic are identified. At 424, arbitration between the local transit queue and the remote transit queue is implemented when transmitting packets from a transit egress port of the network element based on the identified ports that source the largest bandwidths of traffic.

Figure 5:
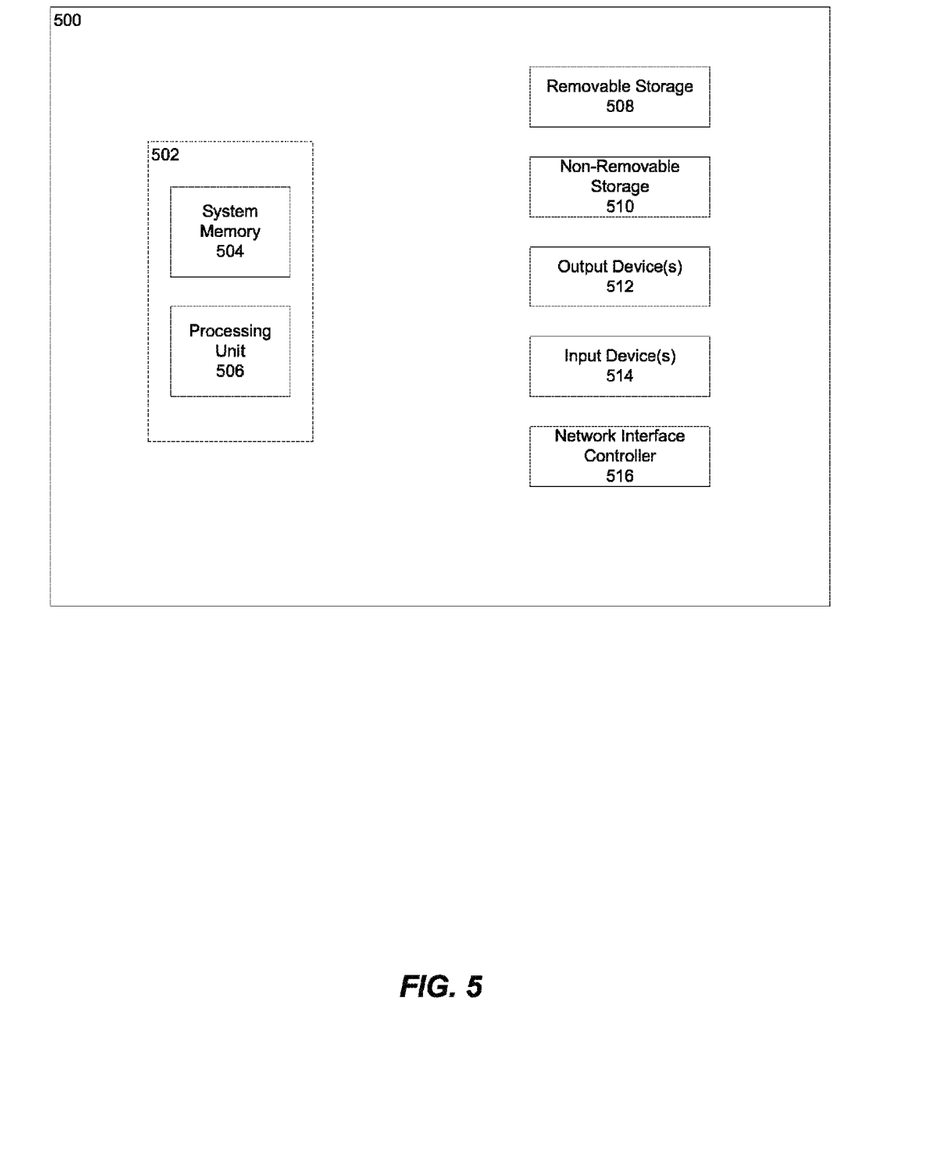
FIG. 5 is a block diagram of an example computing device.

When the logical operations described herein are implemented in software, the process may execute on any type of computing architecture or platform. For example, referring to FIG. 5, an example computing device upon which embodiments of the invention may be implemented is illustrated. In particular, the network elements and network nodes discussed above may be a computing device, such as computing device 500 shown in FIG. 5. The computing device 500 may include a bus or other communication mechanism for communicating information among various components of the computing device 500. In its most basic configuration, computing device 500 typically includes at least one processing unit 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit 506 may be a standard programmable processor that performs arithmetic and logic operations necessary for operation of the computing device 500.

Computing device 500 may have additional features/functionality. For example, computing device 500 may include additional storage such as removable storage 508 and non-removable storage 510 including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Output device(s) 512 such as a display, speakers, printer, etc. may also be included. The additional devices may be connected to the bus in order to facilitate communication of data among the components of the computing device 500. All these devices are well known in the art and need not be discussed at length here.

The processing unit 506 may be configured to execute program code encoded in tangible, computer-readable media. Computer-readable media refers to any media that is capable of providing data that causes the computing device 500 (i.e., a machine) to operate in a particular fashion. Various computer-readable media may be utilized to provide instructions to the processing unit 506 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 506 may execute program code stored in the system memory 504. For example, the bus may carry data to the system memory 504, from which the processing unit 506 receives and executes instructions. The data received by the system memory 504 may optionally be stored on the removable storage 508 or the non-removable storage 510 before or after execution by the processing unit 506.

Computing device 500 typically includes a variety of computer-readable media. Computer-readable media can be any available media that can be accessed by device 500 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing a fairness protocol in a network element, comprising:
   receiving one or more packets at each of a plurality of ingress ports of the network element;
   scheduling the one or more packets into a plurality of queues, wherein each of the plurality of queues is associated with packets that are sourced from one of the plurality of ingress ports;
   monitoring a bandwidth of traffic sourced from each of the plurality of ingress ports;
   identifying a port among the plurality of ingress ports that sources a smallest bandwidth of traffic; and
   arbitrating among the plurality of queues when transmitting packets from an egress port of the network element by giving precedence to the identified port that sources the smallest bandwidth of traffic, wherein giving precedence to the identified port comprises transmitting additional packets from a queue associated with packets that are sourced from the identified port, and wherein arbitrating among the plurality of queues distributes a bandwidth of the egress port equally among the plurality of ingress ports.

2. The method of claim 1, wherein monitoring a bandwidth of traffic sourced from each of the plurality of ingress ports further comprises maintaining a bandwidth table comprising a counter for traffic sourced from each of the plurality of ingress ports.

3. The method of claim 2, further comprising incrementing the counter for traffic sourced from each of the plurality of ingress ports based on a number of bytes or a number of packets transmitted by each of the plurality of ingress ports.

4. The method of claim 3, further comprising decrementing the counter for traffic sourced from each of the plurality of ingress ports by at least a fraction of the bandwidth of traffic sourced from each of the plurality of ingress ports every fixed period of time.

5. The method of claim 4, wherein an amount by which the counter for traffic sourced from each of the plurality of ingress ports is incremented or decremented is weighted according to each of the plurality of ingress ports.

6. The method of claim 1, wherein monitoring a bandwidth of traffic sourced from each of the plurality of ingress ports further comprises sampling and statistically analyzing traffic sourced from each of the plurality of ingress ports.

7. The method of claim 6, wherein sampling and statistically analyzing traffic sourced from each of the plurality of ingress ports comprises using an elephant trap.

8. A network element, comprising:
a plurality of ingress ports;
a processing unit;
a memory communicatively connected to the processing unit; and
a program module that executes in the processing unit from the memory and that, when executed by the processing unit, causes the network element to provide a fairness protocol by:
receiving one or more packets at each of the plurality of ingress ports;
scheduling the one or more packets into a plurality of queues, wherein each of the plurality of queues is associated with packets that are sourced from one of the plurality of ingress ports;
monitoring a bandwidth of traffic sourced from each of the plurality of ingress ports;
identifying a port among the plurality of ingress ports that sources a smallest bandwidth of traffic; and
arbitrating among the plurality of queues when transmitting packets from an egress port of the network element by giving precedence to the identified port that sources the smallest bandwidth of traffic, wherein giving precedence to the identified port comprises transmitting additional packets from a queue associated with packets that are sourced from the identified port, and wherein arbitrating among the plurality of queues distributes a bandwidth of the egress port equally among the plurality of ingress ports.

9. The network element of claim 8, wherein monitoring a bandwidth of traffic sourced from each of the plurality of ingress ports further comprises maintaining a bandwidth table comprising a counter for traffic sourced from each of the plurality of ingress ports.

10. The network element of claim 9, wherein the program module further causes the network element to provide the fairness protocol by incrementing the counter for traffic sourced from each of the plurality of ingress ports based on a number of bytes or a number of packets transmitted by each of the plurality of ingress ports.

11. The network element of claim 10, wherein the program module further causes the network element to provide the fairness protocol by decrementing the counter for traffic sourced from each of the plurality of ingress ports by at least a fraction of the bandwidth of traffic sourced from each of the plurality of ingress ports every fixed period of time.

12. The network element of claim 11, wherein an amount by which the counter for traffic sourced from each of the plurality of ingress ports is incremented or decremented is weighted according to each of the plurality of ingress ports.

13. The network element of claim 8, wherein monitoring a bandwidth of traffic sourced from each of the plurality of ingress ports further comprises sampling and statistically analyzing traffic sourced from each of the plurality of ingress ports.

14. The network element of claim 13, wherein sampling and statistically analyzing traffic sourced from each of the plurality of ingress ports comprises using an elephant trap.

15. A non-transitory computer-readable recording medium having computer-executable instructions stored thereon for providing a fairness protocol that, when executed by a processing unit of a network element, cause the processing unit to:
receive one or more packets at each of a plurality of ingress ports of the network element;
schedule the one or more packets into a plurality of queues, wherein each of the plurality of queues is associated with packets that are sourced from one of the plurality of ingress ports;
monitor a bandwidth of traffic sourced from each of the plurality of ingress ports;
identify a port among the plurality of ingress ports that sources a smallest bandwidth of traffic; and
arbitrate among the plurality of queues when transmitting packets from an egress port of the network element by giving precedence to the identified port that sources the smallest bandwidth of traffic, wherein giving precedence to the identified port comprises transmitting additional packets from a queue associated with packets that are sourced from the identified port, and wherein arbitrating among the plurality of queues distributes a bandwidth of the egress port equally among the plurality of ingress ports.

16. The non-transitory computer-readable recording medium of claim 15, wherein monitoring a bandwidth of traffic sourced from each of the plurality of ingress ports further comprises maintaining a bandwidth table comprising a counter for traffic sourced from each of the plurality of ingress ports.

17. The non-transitory computer-readable recording medium of claim 16, having further computer-executable instructions stored thereon that, when executed by the processing unit of the network element, cause the processing unit to increment the counter for traffic sourced from each of the plurality of ingress ports based on a number of bytes or a number of packets transmitted by each of the plurality of ingress ports.

18. The non-transitory computer-readable recording medium of claim 17, having further computer-executable instructions stored thereon that, when executed by the processing unit of the network element, cause the processing unit to decrement the counter for traffic sourced from each of the plurality of ingress ports by at least a fraction of the bandwidth of traffic sourced from each of the plurality of ingress ports every fixed period of time.

19. The non-transitory computer-readable recording medium of claim 18, wherein an amount by which the counter for traffic sourced from each of the plurality of ingress ports is incremented or decremented is weighted according to each of the plurality of ingress ports.

20. The non-transitory computer-readable recording medium of claim 15, wherein monitoring a bandwidth of traffic sourced from each of the plurality of ingress ports further comprises sampling and statistically analyzing traffic sourced from each of the plurality of ingress ports.

* * * * *